Nov. 1, 1932.  E. S. BECKETTE  1,885,890
RAILWAY TRUCK AND BOLSTER LOCKING DEVICE
Filed June 6, 1931
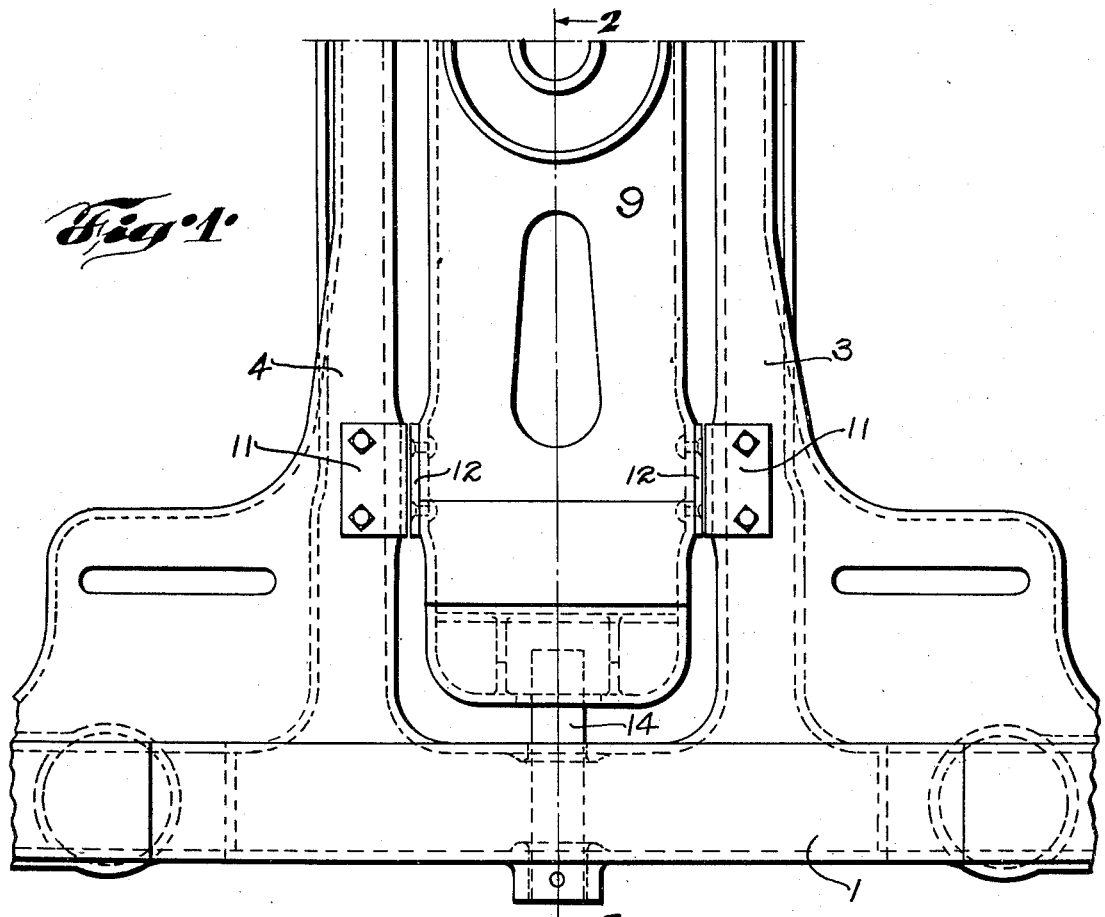
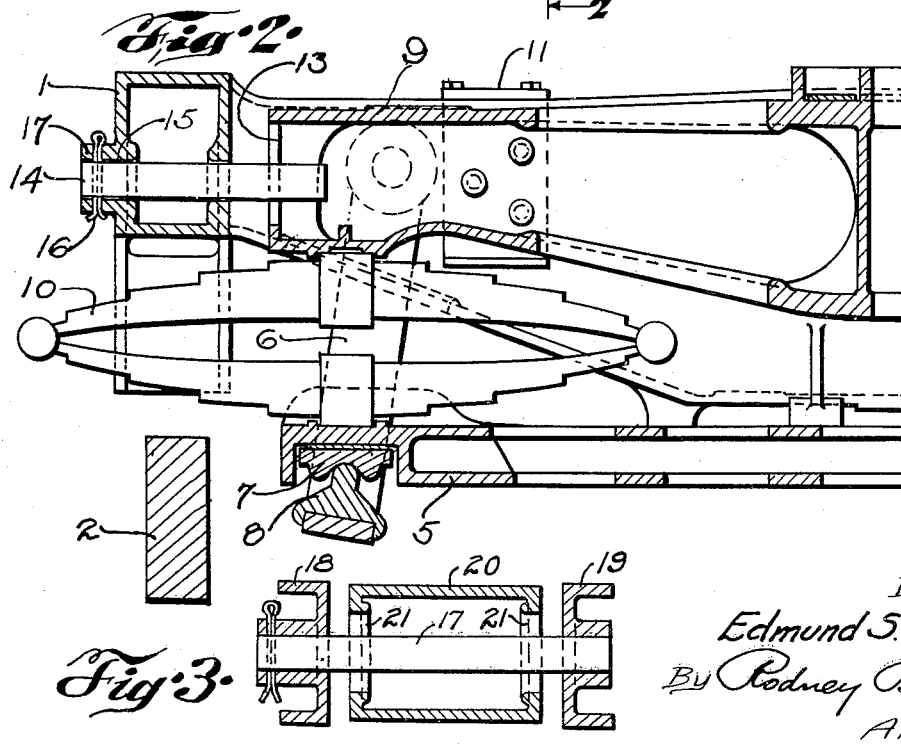
Inventor
Edmund S. Beckette
By Rodney Bedell
Attorney Patented Nov. 1, 1932

1,885,890

UNITED STATES PATENT OFFICE

EDMUND S. BECKETTE, OF EAST ST. LOUIS, ILLINOIS, ASSIGNOR TO GENERAL STEEL CASTINGS CORPORATION, OF GRANITE CITY, ILLINOIS, A CORPORATION OF DELAWARE

RAILWAY TRUCK AND BOLSTER LOCKING DEVICE

Application filed June 6, 1931. Serial No. 542,676.

This invention relates to railway rolling stock and consists particularly in novel means for locking a truck bolster to the truck frame.

In truck construction, it is common practice to provide a locking center pin for connecting the truck bolster to the car underframe or body bolster so that the truck will not become disengaged from the car underframe in case of derailments and when the car is hoisted in the shops. It is also desirable to provide locking means between the bolster and the truck frame for preventing the disengagement of the bolster from the truck frame in such cases, and especially where a swinging bolster is used.

Bolster locking means have been provided in which straps secured to the top of the bolster extend over the truck transoms, or a bar or plate secured to the bottom of the bolster extends beneath the truck transoms, or an extension on the end of the bolster is adapted to engage the truck side frame. However, none of these bolster locking means may be used advantageously in all types of trucks due to difficulties of construction, since frequently they limit the clearance necessary for brake rigging, spring plank or bolster springs, and since inaccessibility makes their removal difficult.

The main object of my present invention is to provide a simple and effective bolster locking device which will occupy space ordinarily not required for other truck fittings and which may be easily applied and readily removed. I attain these objects and others hereafter appearing in the structure illustrated in the accompanying drawing in which—

Figure 1 is a partial top view of one-half of a truck frame and bolster embodying my invention.

Figure 2 is a vertical section of the same taken on line 2—2 of Figure 1.

Figure 3 is a modification showing a vertical transverse section through the truck transoms and bolster.

The truck shown in the drawing includes a side frame wheel piece 1 and an equalizer bar 2 carried on wheels and axles through the usual journal boxes (not shown). Transoms 3 and 4 extend transversely of the truck between opposite sides frames and a spring plank 5 is supported from the transoms by means of swinging links 6 and pivot bearings 7 and 8. A bolster 9 is disposed between transoms 3 and 4 and is supported upon leaf springs 10 which, in turn, rest upon the spring plank 5. Chafing plates 11, secured to the transoms, are provided to engage bearings 12 on the bolster for maintaining the bolster in substantial alignment with the truck transoms.

An opening 13 is provided in each end of the bolster 9, and a pin 14, extending through an opening 15 in boss 17 on the outside of wheel piece 1 and secured therein by a cotter key 16, projects through opening 13 into the bolster. Opening 13 is sufficiently large to permit the bolster 9 to move freely either longitudinally or vertically during normal operation of the truck, to accommodate compression of the springs 10 and play of the bolster between the transoms, but in case unusual lifting forces are applied to the bolster, pin 14 will be engaged and serves to prevent the bolster from being completely lifted from its supporting springs and swing links 6.

If desired the pins may be mounted in truck transoms and the bolster can be provided with openings in the sides instead of in the ends, as shown in Figure 3. In this modification the pin 17 is inserted transversely through the transoms 18 and 19 and through the bolster 20. Openings 21 in the side walls of the bolster are sufficiently large to permit the bolster 20 to move freely either transversely of the truck or vertically during normal operation of the truck and otherwise serves the same purpose as the pin 14 of the structure shown in Figures 1 and 2.

It will be seen that in both forms illustrated the novel bolster locking means is comparatively simple and occupies space which is not required for other truck rigging. Moreover, pins 14 and 17 may be readily withdrawn from the outside when the truck is to be disassembled. The form of truck shown as well as the detail structure of the side frames, bolster, springs, spring plank, swing links and bearings, in themselves do not constitute the present invention and consequently any suitable types of structure might be adopted. Moreover, the invention is not limited to use in connection with swinging bolsters.

Obviously, certain other details of my invention may be varied without departing from the spirit thereof and I contemplate the exclusive use of all such variations as come within the scope of my claims.

I claim:

1. In a truck for a railway vehicle, a truck frame and a bolster, there being a lateral opening in said bolster, and an element projecting horizontally from said frame and extending into said opening to limit relative vertical movement of said bolster and frame.

2. In a truck for a railway vehicle, spaced frame members and a bolster movably mounted therebetween and terminating at points between said members, and elements each projecting from one of said frame members and adapted to prevent disassembly of said bolster from said members by relative vertical movement thereof.

3. In a truck for a railway vehicle, spaced frame members and a bolster movably mounted therebetween and terminating at points between said members, there being openings in said bolster, and elements each projecting from one of said members and extending into said openings to prevent disassembly of said bolster from said members by relative vertical movement thereof.

4. In combination in a railway truck, spaced side frames, a transom extending therebetween, a bolster movable longitudinally and vertically relative to said transom and having an opening in each end thereof, and elements projecting from said side frames and each extending into one of said openings, said openings being enlarged longitudinally and vertically of said truck to permit normal longitudinal and vertical movement of said bolster relative to said frames.

5. In combination in a railway truck, a side frame member, a transom member, a bolster movable longitudinally and vertically relative to said transom member and having an opening therein, and an element on one of said members and extending into said opening, said opening being enlarged to permit normal longitudinal and vertical movement of said bolster relative to said members.

6. In a truck for a railway vehicle, a bolster, a box section side frame member, and a pin extending transversely through the vertical walls of said member and engaging said bolster to prevent disassembly of said bolster from said member by relative vertical movement thereof.

7. In a truck for a railway vehicle, a bolster, a box section side frame member, and a pin extending transversely through and detachably secured to the outer wall of said member and engaging said bolster to prevent disassembly of said bolster from said member by relative vertical movement thereof.

8. In a truck for a railway vehicle, a transom, a bolster having an opening therein, and a removable pin seated in said transom and extending into said opening to prevent disassembly of said bolster and transom by relative vertical movement thereof.

9. In a truck for a railway vehicle, a side frame member having a boss projecting therefrom, a bolster, a pin extending through said boss and adapted to prevent disassembly of said bolster from said member by relative vertical movement thereof, and a detachable element securing said pin to said boss.

10. In combination in a railway truck, spaced side frames, a spring plank extending therebetween, springs carried by said spring plank, a bolster mounted on said springs and terminating between said side frames and detachable elements projecting inwardly from said side frames and adapted to engage said bolster when abnormal lifting forces are applied thereto to prevent disengagement of said bolster from said springs.

11. In combination in a railway truck, spaced side frames, a transom extending therebetween, a bolster movable longitudinally and vertically relative to said transom and having an opening in each end thereof, and elements projecting from said side frames and each extending into one of said openings, said elements being adapted to permit normal vertical and longitudinal movement of said bolster and to prevent disengagement of said bolster from said frames.

12. In combination in a railway truck, spaced side frames, a transom extending therebetween, a bolster movable longitudinally and vertically relative to said transom and having an opening in each end thereof, and bolster locking pins, each removably secured in one of said side frames and extending into the corresponding end opening in said bolster, said pins being adapted to permit normal vertical and longitudinal movement of said bolster and to prevent disengagement of said bolster from said frames when abnormal lifting forces are applied thereto.

13. In a truck for a railway vehicle, a side frame, a bolster terminating at a point spaced inwardly from said side frame, and an element projecting inwardly from said side frame to hold said bolster against vertical movement away from said side frame.

14. In a truck for a railway vehicle, a side frame, a bolster terminating at a point spaced inwardly from said side frame and having an opening adjacent to said side frame, and an element projecting inwardly from said side frame into said opening to prevent movement of said bolster vertically away from said side frame.

In testimony whereof I hereunto affix my signature this 27th day of May, 1931.

EDMUND S. BECKETTE.